United States Patent [19]

Brouwer

[11] 4,072,301

[45] Feb. 7, 1978

[54] TRACING HEAD AND DRIVE

[75] Inventor: Frans Brouwer, Glencoe, Ill.

[73] Assignee: Stewart-Warner Corporation, Chicago, Ill.

[21] Appl. No.: 614,651

[22] Filed: Sept. 18, 1975

Related U.S. Application Data

[63] Continuation of Ser. No. 386,556, Aug. 8, 1973.

[51] Int. Cl.² .................................................. B23K 7/10
[52] U.S. Cl. ....................................... 266/60; 250/202
[58] Field of Search ......................... 250/202, 216, 239;
318/577; 266/23 R, 23 B, 23 D, 23 E, 23 L, 23
K, 58, 60, 67–69, 72–73; 308/22, 178, 233, 234,
231

[56] References Cited

U.S. PATENT DOCUMENTS

| | | | |
|---|---|---|---|
| 1,022,307 | 4/1912 | Eberhart et al. | 308/234 |
| 2,643,920 | 6/1953 | Olszewski | 308/231 |
| 3,268,731 | 8/1966 | Brouwer et al. | 250/202 |
| 3,328,098 | 6/1967 | Budzich | 308/234 |
| 3,423,590 | 1/1969 | Jewell | 250/202 |
| 3,479,513 | 11/1969 | Simpson et al. | 250/202 |
| 3,493,762 | 2/1970 | Dulebohn | 250/202 |
| 3,496,437 | 2/1970 | Layden | 250/202 |
| 3,499,155 | 3/1970 | Turbett | 250/202 |
| 3,608,878 | 9/1971 | Dreshman | 266/23 K |
| 3,704,373 | 11/1972 | Bardwell et al. | 250/202 |

Primary Examiner—Joseph H. McGlynn
Assistant Examiner—Paul A. Bell

[57] ABSTRACT

A contour tracing apparatus in which the coordinate drive motors are cantilever supported on simple plates and needle thrust bearings to permit the motor pinions to be spring biased into engagement with the respective racks for moving the scanning head and associated tool. Kerf offset is provided by rotation of the scanning head optical assembly about a pivot member, which can be translated along a zero kerf adjustment line to provide forward offset. The pivot member is also eccentrically rotatable in response to rotation of the optical assembly about another axis to properly align the photocells of the optical assembly with a zero kerf mark. The optical assembly includes a plurality of lamps spaced about the photocells and one integral lens structure having annular prism surfaces encircling a convex lens surface to direct light from the lamps to the contour and from the contour to the cells.

8 Claims, 10 Drawing Figures

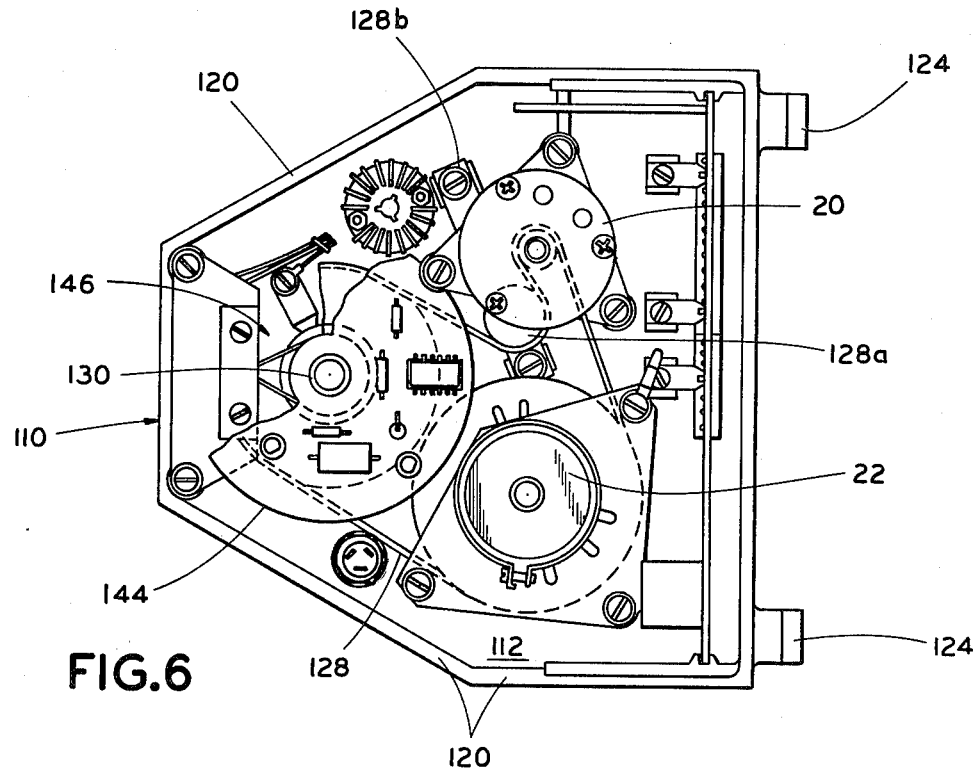
FIG.6
FIG.10
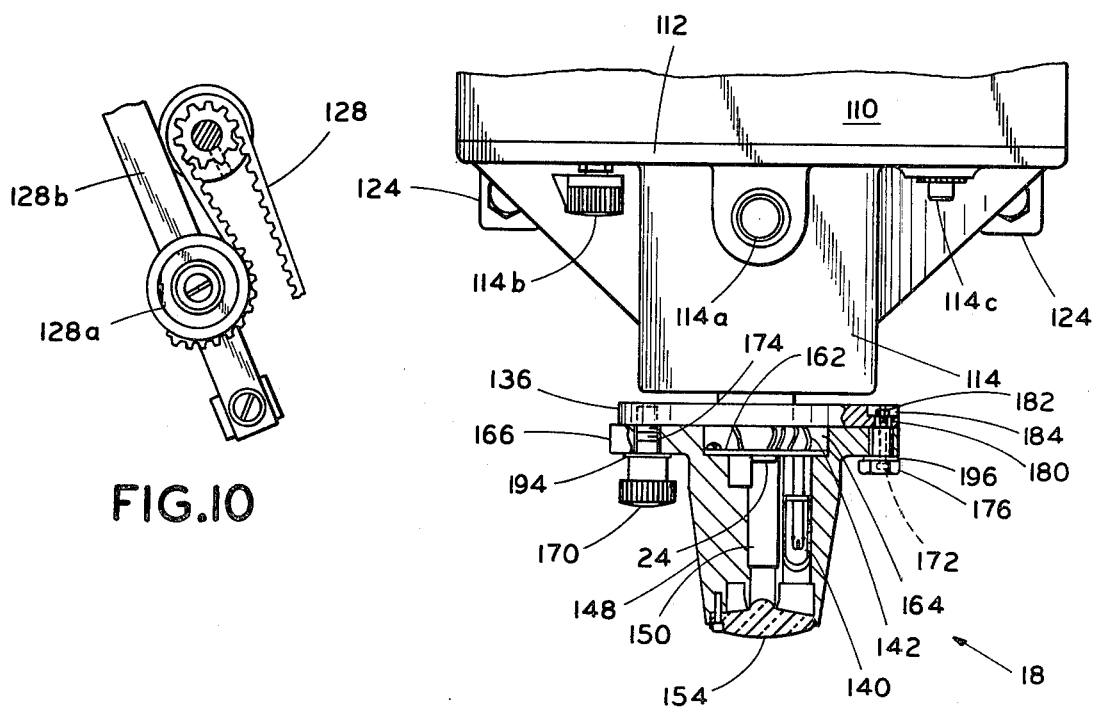
FIG.7

TRACING HEAD AND DRIVE

This is a continuation of my application Ser. No. 386,556, filed Aug. 8, 1973, assigned to the assignee of the present invention.

BACKGROUND OF THE INVENTION

1. Field of the Invention

This invention relates in general to contour tracing apparatus and more particularly to improved and more economical contour tracing apparatus.

2. Description of the Prior Art

Contour tracing apparatus incorporates a tracing or scanning head which usually includes a plurality of photocells to sense a drawing line or pattern edge, hereinafter referred to as a contour. The photocells control the angular orientation of a steering head motor. The angular orientation of the steering head motor in turn controls the angular position of the photocells together with a resolver. The resolver in turn controls the relative speed of a pair of coordinate drive motors. The coordinate drive motors move the head through a respective gear and rack along the contour while one or more cutting torches, for example, moved with the head by the coordinate drive motors, cut a work-piece in a pattern corresponding to the contour.

The coordinate drive motors are each usually pivotally supported on a shaft rotatably supported in expensive spaced bearings located in a pair of spaced expensive bracket arms. The load creates a bending moment on the shaft and the arrangement provides inadequate support against backlash between the gear and rack.

The steering head is also expensive since it utilizes a complicated, large, cast metal housing to accommodate the parts, together with a kerf or tool offset adjustment comprising a rack and gear arrangement and either expensive lens or lamp arrangements.

SUMMARY OF THE INVENTION

The present invention proposes contour tracing apparatus in which the coordinate drive motors for moving the head and forming apparatus such as cutting torches are supported by simple cantilever plates on needle thrust bearings and spring biased to hold the respective pinions in engagement with the respective racks for eliminating backlash.

The present invention also proposes a simplified component arrangement and molded plastic housing for carrying the steering head motor, resolver, optical system, photocells and associated circuitry.

In addition, the present invention provides that the optical system be rotatable about an off-center or eccentric axis to provide a simple structure for both forward offset and kerf adjustment and to simplify the light and lens construction by providing a single integral lens structure including an annular prism for casting light from lamps circumferentially spaced about the photocells onto the contour and a central convex lens structure for focusing the reflected light onto the photocells.

It is therefore a primary object of the present invention to provide an improved and more economical contour tracing apparatus.

Other objects and features of the present invention will become apparent on examination of the following specification together with the claims and accompanying drawings.

BRIEF DESCRIPTION OF THE DRAWINGS

FIG. 6 is a top sectional view of the scanning head assembly;

FIG. 7 is a fragmentary side elevation view of the scanning head with the optical assembly shown in partial section;

FIG. 10 is a fragmentary schematic view illustrating a portion of the timing belt drive arrangement.

DESCRIPTION OF THE PREFERRED EMBODIMENT

Figure 1:
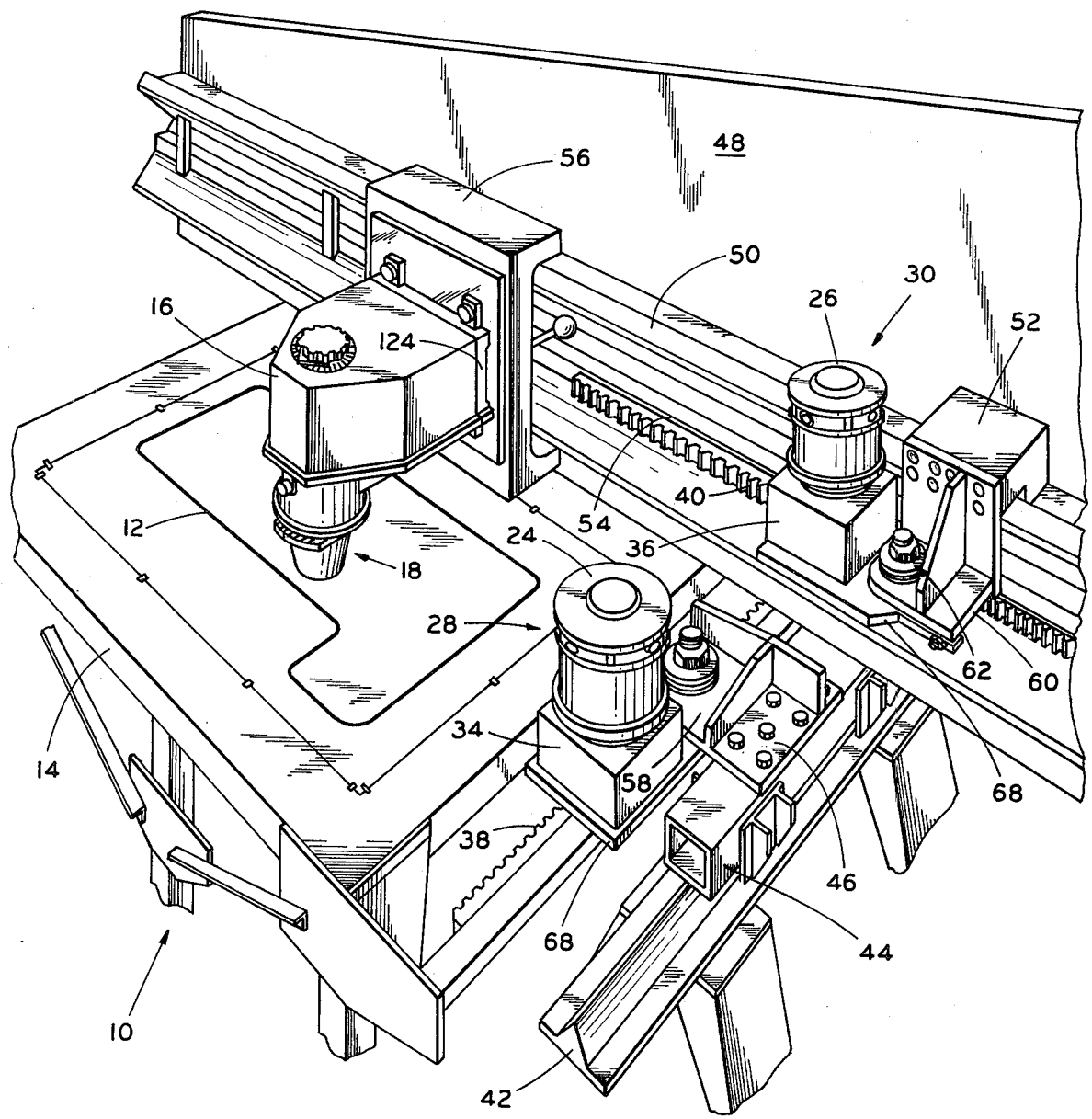
FIG. 1 is an isometric view illustrating the scanning head positioned above a contour together with the coordinate drive motor assemblies for moving the head and cutting torches.

In FIG. 1 contour tracing apparatus indicated by reference character 10 is illustrated for controlling one or more gas cutting torches (not shown). The torches cut a metal workpiece, for example, in a contour corresponding to the contour indicated at 12. The contour 12 may be formed on paper by a drawing line or on a pattern by a pattern edge, as is well known, and is carried on a table 14 below a tracing or scanning head 16.

Figure 5:
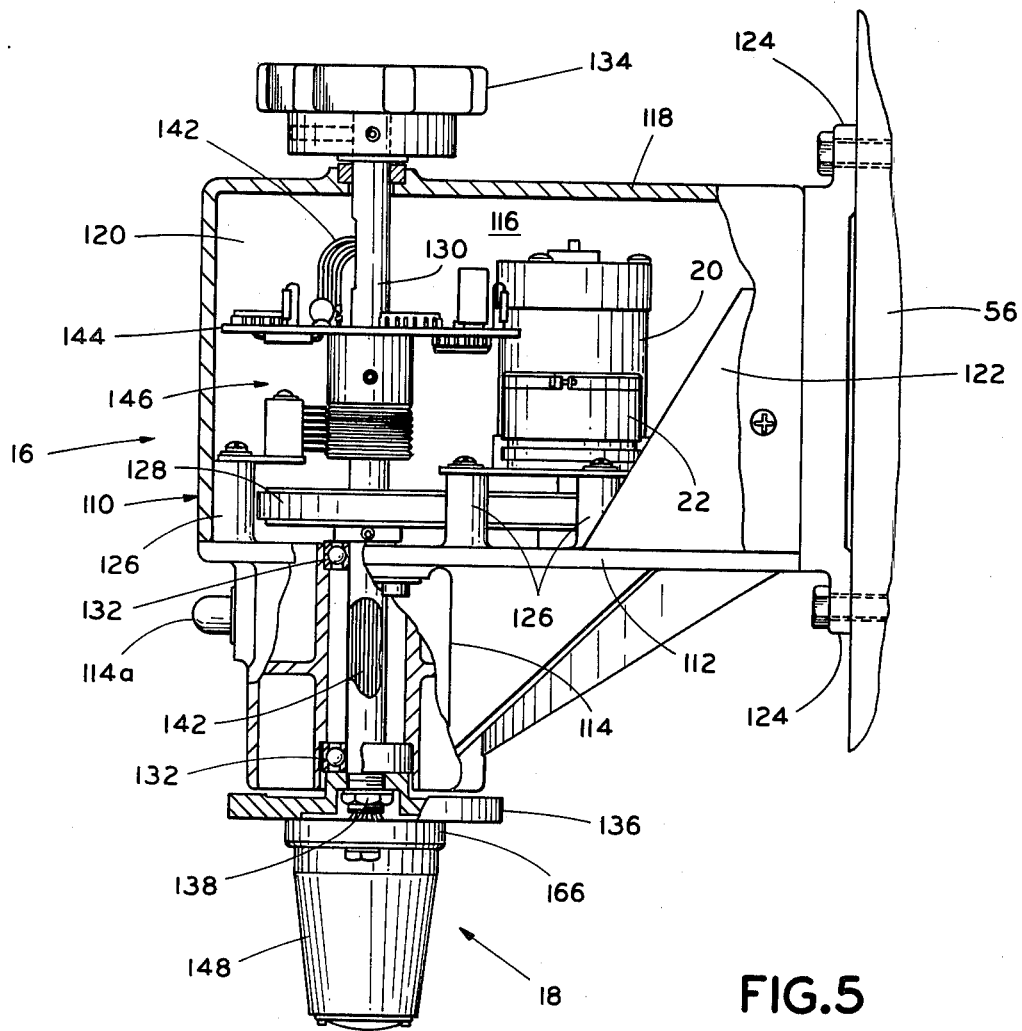
FIG. 5 is a side sectional view of the scanning head assembly.
Figure 8:
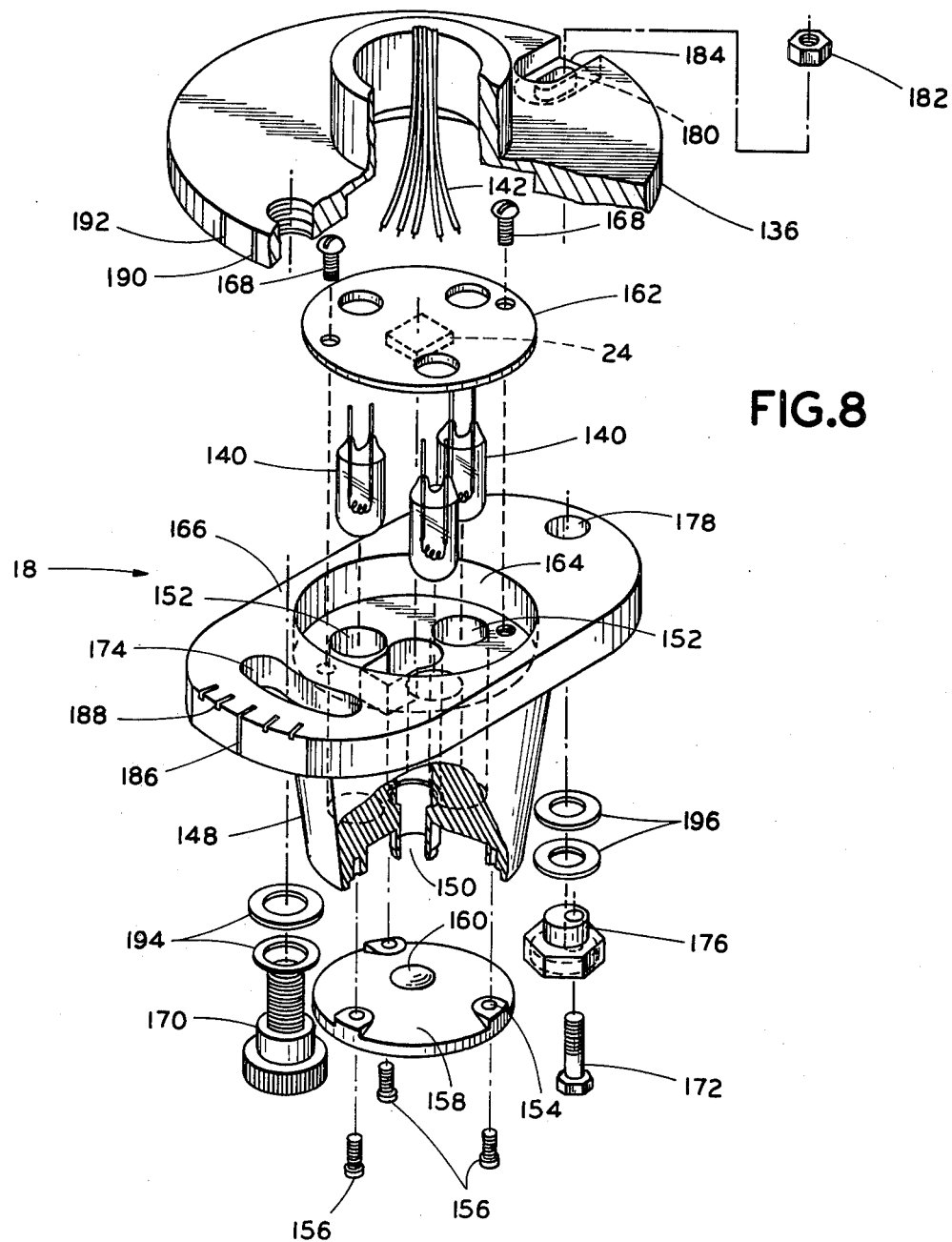
FIG. 8 is an exploded isometric view of the optical and kerf adjustment assembly.
Figure 9:
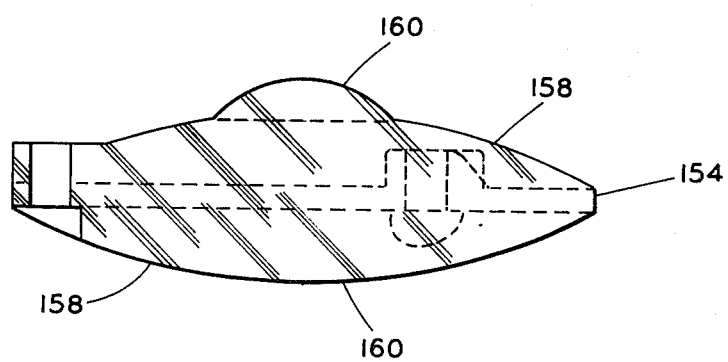
FIG. 9 is a sectional view of the lens.

As seen in FIG. 5, the scanning head 16 includes optical assembly 18, a steering head motor 20 and a resolver 22, for example. A photocell assembly 24, seen schematically in FIG. 8, is carried at one end of the assembly 18 for sensing the contour for controlling the angular orientation of the motor 20 and resolver 22. The motor 20 thereby maintains the assembly at a predetermined angle relative the contour 12 and controls the angular position of resolver 22 to in turn control a pair of coordinate drive motors 24 and 26 of respective motor assemblies 28 and 30.

The motors 24 and 26 move the head 16 along the contour 12 and the cutting torches along a path of identical contour. Each coordinate drive motor assembly 28 and 30 includes a respective pinion 32, seen in FIG. 2, rotated by the respective motor through the gearing in a respective reduction box 34 and 36. Each pinion 32 engages a respective rack 38 and 40.

The rack 38 has an associated guideway 42 on which a frame member 44 is supported for longitudinal movement. Frame member 44 has a cantilever bracket 46 for supporting motor assembly 28 and is moved relative to rack 38 and guideway 42 in response to operation of motor 24. The frame member 44 carries a second frame member 48 having a longitudinal axis perpendicular to the longitudinal axis of guideway 42.

The frame member 48 carries a guideway 50 along which the cutting torches (not shown) are adapted to move transverse or perpendicular to the axis of guideway 42. The frame member 48 carries a cantilever bracket 52 on which the motor assembly 30 is supported for moving a rack 54 on its guideway in a direction perpendicular to the movement of frame member 44. The cutting torches are secured to the rack 54 and the scanning head 16 is secured to rack 54 by means of a bracket 56 for movement with the rack 54.

Figure 2:
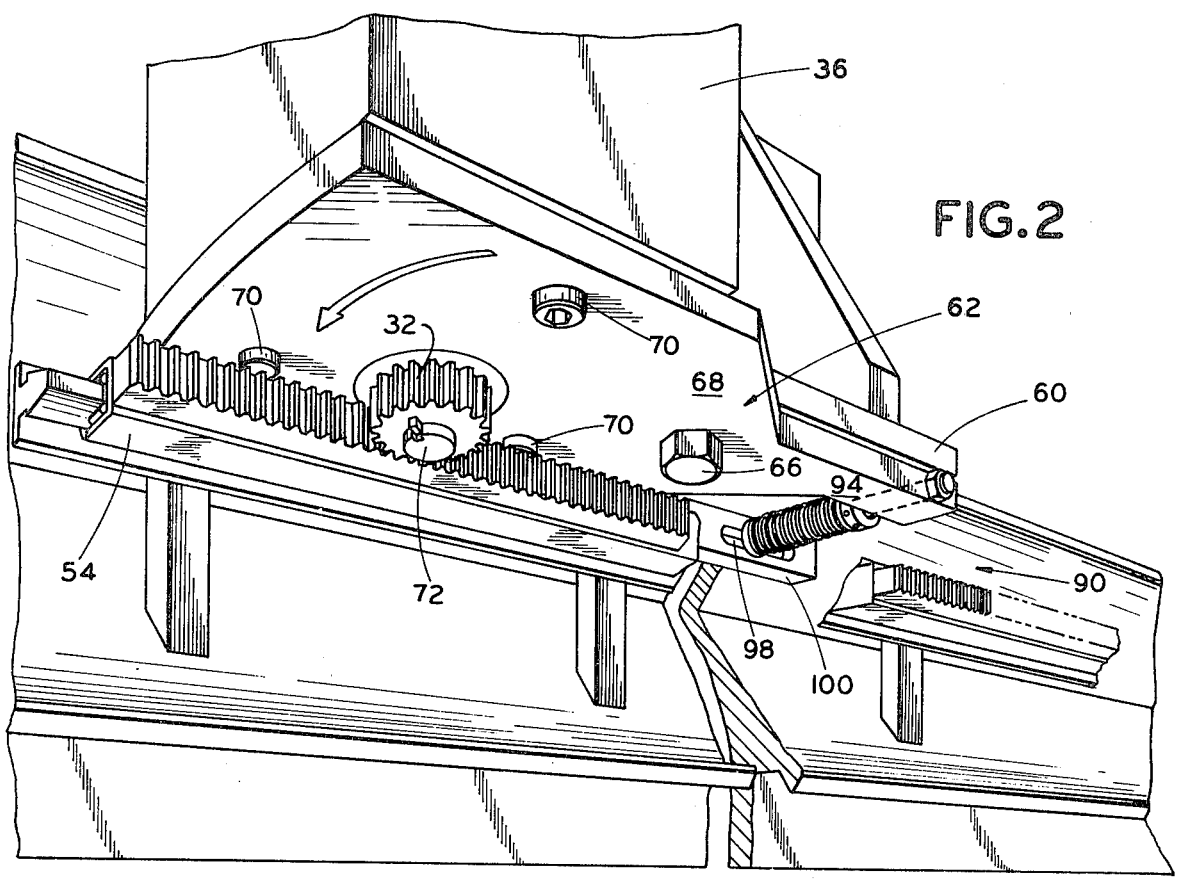
FIG. 2 is an isometric view of a portion of the coordinate motor pivot and the spring biasing assemblies illustrating the pinion and rack engagement.
Figure 3:
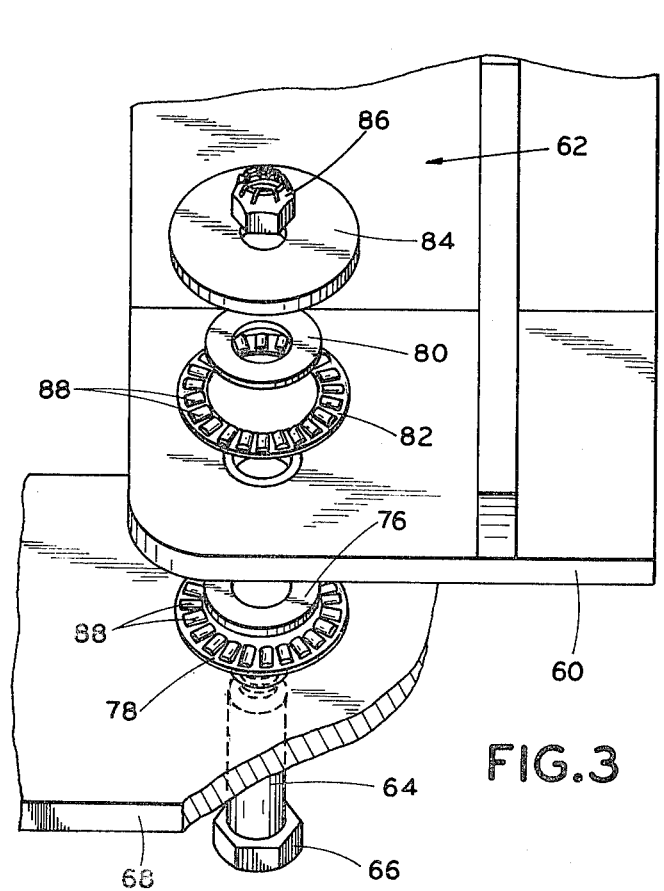
FIG. 3 is an exploded isometric view of the pivot assembly.
Figure 4:
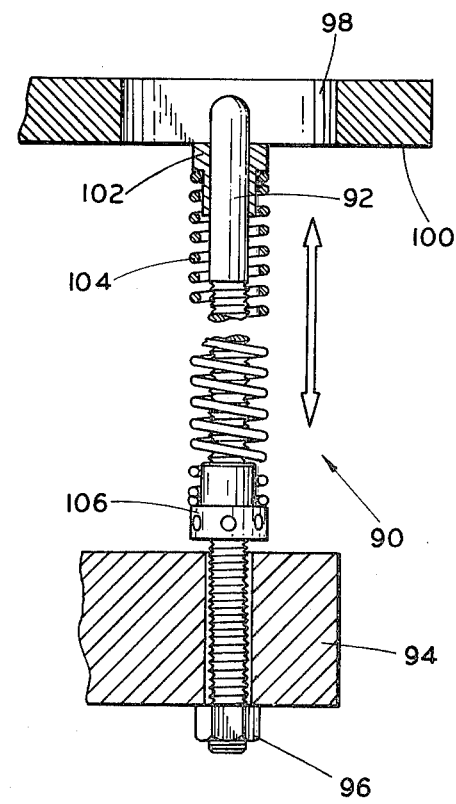
FIG. 4 is a sectional view illustrating the spring assembly.

The brackets 46 and 52 each have a horizontal cantilever plate or platform 58 and 60 respectively, on which the assemblies 24 and 26 are pivotally supported by means of pivot assemblies 62. The pivot assemblies 62, as seen in FIGS. 2 and 3, each include a pin or bolt 64 having a head 66 at one end and extending through a motor assembly horizontal plate 68 and the bracket plate 58 and 60. Each motor assembly plate 68 extends past the end of the bracket plate 58 and 60 at a plane above the rack 38 and 54. The gear boxes 34 and 36 together with the motors 24 and 26 are fixed to the upper surface of plates 68 by means of bolts 70 with each pinion 32 secured to a shaft such as 72 and located adjacent the lower surface of the respective plate 68 for engaging a rack 38 or 40.

The pins or bolts 64 have a straight or unthreaded shank portion approximately 1¼ inch long and having a diameter of 0.625 inch extending through plates 68 and the bracket plate 58 or 60. A washer 76 closely encircles the bolt and is encircled by a needle thrust bearing 78 with both washer 76 and bearing 78 sandwiched between respective plates 68 and the bracket plates 58 or 60. A second washer 80 similar to washer 76 and a bearing 82 similar to bearing 78 encircle bolt 64 above the respective bracket plate 58 or 60 and the bearing 82 is overlapped by a washer 84. A nut 86 engages the threaded end of bolt 64 projecting above washer 84 with the nut 86 bearing against washer 84 and the nut is secured against movement.

The washer 84 has an outer diameter of substantially 2¼ inches so as to overlap the bearing 82 which has an outer diameter of substantially 2 inches and an inner diameter of 1.3 inches to just encircle washer 80. The bearings 78 and 82 comprise a series of rollers 88 having a diameter of substantially 0.138 inch to separate the plates by a like distance and arranged for rotation about their individual axes. Plates 68 are each substantially three-eighth inch thick; and plates 58 and 60 are each substantially one-half inch thick; and washer 84 is substantially one-fourth inch thick. With this arrangement, the plates 68 and motor assemblies 28 and 30 are supported despite their substantial weight and under loads as high as 10,000 pounds for rotatable movement about the axis of bolt 64 by a spring assembly 90.

The spring assembly 90 comprises a stem 92 having threads at one end threaded through a reduced or narrowed portion 94 of each plate 68 for receiving a locking nut 96. The opposite or unthreaded end of stem 92 extends into an opening or recess 98 formed in a depending wall 100 on the bracket plate 58 and 60. A collar 102 riding or slidably carried on the unthreaded end of stem 92 is held engaged with the edge of opening 98 by a spring 104 encircling the stem 90 and a threaded collar 106 threaded on stem 92. Collar 106 is threaded on stem 106 to adjust the biasing pressure or tension of spring 104 for biasing plate 68 into rotation about the pivot axis of bolt 64 for holding the respective pinion 32 in tight engagement with the respective rack 38 and 54 and the collar is secured in position.

With the described pivot assemblies 62, considerable pressure can be applied between the pinions 32 and racks 38 and 40 by the spring 104 to eliminate a backlash, while the large bearing areas of bearings 78 and 82 provide more than adequate support for the cantilevered motor assembly load.

The scanning head 16 includes a plastic housing assembly 110 having a bottom wall 112 from which a generally tubular integrally formed housing 114 and signal lamp 114a, together with operating switches 114b and 114c or potentiometers depend, as seen in FIG. 7. A cover member 116 having a top wall 118 and side walls 120 is secured to wall 112 by means of standards or brackets 122 formed on the bottom wall. Two pair of integral bracket ears 124 formed on bottom wall 112 secure the head 16 to the machine bracket 56.

The wall 112 has a plurality of integrally formed supports or posts such as 126 for carrying the steering servo motor 20, the resolver 22 or other apparatus such as terminal blocks. The motor 20 rotates the shaft of resolver 22 by means of a toothed timing belt 128, which is engaged by a toothed idler wheel 128a carried on a bracket 128b, as seen in FIGS. 6 and 10. The belt 128 also rotates a shaft 130 having a hollow axial portion for the purpose of angularly orienting the optical assembly 18 carrying the photocell assembly 24, and with the toothed coupling of the rotated parts, ensures continued alignment therebetween. The angular position of the shaft of resolver 22 controls the relative speed of the coordinate drive motors 24 and 26 through a circuit arrangement, as for example shown in the applicant's U.S. Pat. No. 3,852,590, issued Dec. 3, 1974, for driving the head and torches along the path describing the contour 12.

The shaft 130 is journaled by spaced bearings 132 in housing 114 and by a bearing in the wall 118 of housing assembly 110 with the shaft extending through the wall 118 to receive a knob or handle 134 for enabling manual rotation. The lower end of shaft 130 is threaded and has a plate or member 136 secured thereto by means of a nut 138.

The member 136 carries the optical assembly 18 including the photocell assembly 24 and a plurality of lamps 140, best seen in FIG. 8. A plurality of leads 142 extend from the photocell assembly and lamps through the hollow portion of shaft 130 for the purpose of extending connnections to an appropriate circuit board arrangement 144 having circuit components such as operational amplifiers described in the aforementioned U.S. Pat. No. 3,852,590 for controlling the steering and coordinate drive motors, and carried on shaft 130. From the circuit board arrangement 144 connections are extended through a conventional slip ring assembly 146 to suitable electrical apparatus.

The optical assembly 18 comprises a generally tubular housing 148 having a central axial passageway 150 aligned with photocell assembly 24 and a plurality of axially extending equiangularly spaced passageways 152 located about passageway 150. The passageways 152 are aligned with lamps 140 for transmitting light to the contour 12 through a lens structure 154 and for enabling light projected from the contour 12 to be transmitted through the lens structure to the photocell assembly.

The lens structure 154 is secured to the lower end of housing 148 by screws 156 adjacent the periphery and has annular prism surfaces 158 to direct light toward the axis of passageway 150 encircling central convex surfaces 160 for focusing the light from the contour 12 on the photocell assembly 24. The photocell 24 and the lamps 140 are carried by a card 162 secured in a recess 164 formed in a rotatable plate 166 by means of screws 158.

Plate 166 is integrally formed at the upper end of housing 148 and is secured to the rotatable platform or plate 136 by screws 170 and 172 so that the optical assembly 18, including the photocell assembly 24, rotates with shaft 130 to maintain the photocells at the proper angular orientation relative the contour 12. Screw 170 passes through a curved slot 174 of larger cross section adjacent one end of plate 166 and screw 172 passes through an eccentric member 176 located in a second opening 178 formed adjacent an end of plate 166 opposite slot 174 or at 180° from the slot mid-point. The head of screw 172 seats in a recess of member 176 with the screw having a straight shank portion passing through member 176 at a position offset from the axis of member 176 close to a line extending from the axis of screw 170. Screw 172 passes through a slot 180 in plate 136 and engages a nut 182 seated in a longitudinal slot 184 at right angles to slot 180 for tightening member 176 against the bottom face of plate 136.

Member 176 permits the photocell assembly to be easily adjusted for zero kerf alignment and slot 180 permits member 176 and plate 166 to be moved or offset from the axis of shaft 130 to provide what is commonly known as forward offset in the direction of scanning to facilitate the following of curves or bends in the contour 12. This adjustment is usually made prior to machine installation. Thus, a zero kerf mark 186 of a series of kerf indicia 188 on plate 166 is aligned with a zero kerf line 190 of a series of indicia 192 on plate 136. Screw 170 is tightened in plate 136 against spring washers 194 and plate 166 rotated about the axis of screw 170, while the screw 172 is loose to permit rotation of eccentric member 176 about screw 172 to translate plate 166 and the photocell assembly transverse to a line from mark 190 to the axis of shaft 130. A contour beneath the photocell assembly is sensed to provide an appropriate output signal on alignment of the photocell assembly with the contour. This indicates that the photocell assembly is centered on a line generally extending from aligned marks 186 and 190 to the axis of shaft 130 for the purpose of compensating for manufacturing tolerances.

Rotation of the optical assembly through 180° to determine if the photocell assembly provides the proper signal with the contour position changed enables the zero kerf adjustment to be easily checked, and if ncessary the procedure is repeated. With the adjustment for zero kerf properly made, the screw 172 may be moved in slot 180 to translate the eccentric member 176, plate 166 and the photocell assembly along the zero kerf line, passing through the zero kerf indicia 186 and 190 to the axis of shaft 130 to provide the desired forward offset for the photocell assembly relative the axis of shaft 130. Screw 170 is smaller than the slot 174 so translation along the zero kerf line is permitted while the angular position of eccentric member 176 is held to maintain the zero kerf adjustment. The amount of translation or forward offset may, of course, be determined by the movement necessary to sense a change in different contour positions or the position of nut 182 in slot 184. Screw 172 is then tightened to hold the eccentric member 176 against plate 136 with the head of member 176 bearing against plate 166 through a pair of spring washers 196. The plate 166 may thereafter be rotated about the axis of member 176 while member 176 is held fixed relative plate 136 to ensure the initial kerf zero alignment and forward offset are maintained.

Kerf adjustment is thereafter provided to compensate for tool cutting width. Thus, the knurled end of screw 170 may be manually rotated to control the pressure of spring washers 194 and permit plate 166 to be rotated about the axis of member 176. It will be noted that member 176 does not rotate, while plate 166 can rotate relative plate 136 and shaft 130 against the pressure of spring washers 196 to offset the photocell axis from the zero kerf adjustment line passing through the zero indicia 190 on plate 136 and the axis of shaft 130 by an amount corresponding to the movement of plate 166. The kerf adjustment is selected by alignment of mark 186 with one of the indicia 192 on plate 136 corresponding to the desired kerf adjustment. Spring washers 194 firmly hold plate 166 in the desired position on tightening of screw 170 with the photocell axis displaced so that it will follow the contour with the shaft 130 offset from the contour by a distance corresponding to the tool kerf.

The foregoing is a description of an improved and more economical contour scanning or tracing apparatus, whose inventive concepts are believed incorporated in the foregoing, together with the accompanying drawings and claims.

What is claimed is:

1. For use in a contour tracing system, a tracing head comprising a shaft, a housing assembly rotatably carrying said shaft, a steering motor carried by said housing for rotating said shaft, a photocell assembly, circuit means responsive to a signal from said photocell assembly for controlling said motor to rotate said shaft, an optical assembly including a housing for carrying said photocell assembly, means carried by said shaft for rotation therewith, respective indicia including a zero mark on said shaft carried means and on said optical assembly housing, first means connecting said optical assembly housing to said shaft means for securing said optical assembly to said shaft for rotation with said shaft, and first eccentric means rotatable about the axis of said connecting means with said zero marks in registration for translating said optical assembly housing and photocell assembly transverse to a line extending from said shaft carried means zero mark to the axis of said shaft to provide said photocell assembly with zero kerf adjustment in response to said photocell assembly being in registration with said line, and means extending through the housing and into the shaft carried means opposite said eccentric permitting rotation of said housing about said first connecting means thereby providing the normal kerf adjustment.

2. In the system claimed in claim 1, means for enabling translation of said optical assembly housing including said photocell assembly and said eccentric means along said line to displace said photocell assembly from said shaft axis to provide forward offset.

3. In the head claimed in claim 2, a plurality of lamps in positions spaced circumferentially about said photocell assembly, and an integrally formed lens structure adjacent one end of said optical assembly housing having annular surfaces for directing light from said lamps toward said contour and a central surface encircled by said annular surfaces and of different curvature than said annular surfaces for directing light from said contour to said photocell assembly.

4. In the head claimed in claim 2, a resolver, and a toothed timing belt for transmitting movement from said steering motor to said shaft and resolver.

5. The head claimed in claim 4 in which said housing assembly carrying said shaft comprises a plastic lower wall having a plurality of integrally formed standards thereon for carrying said steering motor and resolver in spaced positions, an integrally formed tubular housing depending from said lower wall for receiving said shaft, and an upper plastic wall having side walls depending therefrom and secured to said bottom wall.

6. The head claimed in claim 5 in which said circuit means includes a printed circuit board secured to said shaft for rotation therewith, a brush and slip ring assembly associated with said shaft, and means connecting said printed circuit board to said brush and slip ring assembly.

7. For use in a contour tracing system of the type including a steering motor for rotating a shaft in response to a signal from a photocell assembly, the improvement comrpsing an optical assembly including a housing and carrying said photocell assembly, means on said shaft for rotation therewith having a first zero mark, indicia including a second zero mark on said optical assembly housing, means connecting said optical assembly housing to said shaft at a position offset from the axis of said shaft for securing said optical assembly to said shaft for rotation with said shaft, first eccentric means in said housing rotatable about an axis of said connecting means with said zero marks in registration for translating said optical assembly housing and photocell assembly to a line extending from said first zero mark to said shaft axis to provide said photocell assembly with zero kerf adjustment, second connecting means between said shaft carried means and said housing means permitting rotation of said housing means about the axis of said first connecting means to thereby provide the normal kerf adjustment, and means for enabling translation of said optical assembly housing including said photocell assembly and said eccentric means along said line to displace the optical axis of said photocell assembly from the axis of said shaft to provide forward offset.

8. For use in a contour tracing system including a scanning head for following a contour and a tool for movement therewith along a path corresponding to said contour, the improvement comprising a pair of coordinate drive motors, a pinion for each motor rotated by the associated motor, a pair of longitudinally extending racks, first means movable parallel to the longitudinal axis of one of said racks and carrying the other rack with the longitudinal axis of the other rack arranged transverse to said one rack longitudinal axis, second means carried by said first means for movement with said first means, a first cantilevered plate extending from each said means, a second cantilevered plate for each first plate with each second plate carrying one of said motors and pinion, a pin for each motor second plate with each pin extending through the first and second plates, a needle thrust bearing located between each first plate and the associated second plate and encircling the pin with each bearing comprising a plurality of rollers arranged for rotatable movement along an axis individual to each roller and rotatable movement about the axis of the respective pin, means for securing each said first and second plate against axial movement relative the respective pin, compression means for biasing each second plate for pivotal movement in one direction about the pin axis to hold the pinions engaged with the racks, said pin being between the associated pinion and compression biasing means, means carrying said head for movement along the longitudinal axis of said other rack in response to rotation of the associated mtor pinion, means carried by said head for controlling the operation of said motors for rotating said pinions to move said first means and said means carrying said head relative the rack axis for moving said head and tool along a path corresponding to said contour, said means for controlling said coordinate drive motors including a steering motor carried by said head, a resolver carried by said head and controlled in accordance with the angular position of said steering motor for controlling the relative speed of said coordinate drive motors, an optical assembly including a housing, a photocell assembly carried by said optical assembly housing, circuit means responsive to a signal from said photocell assembly for controlling said steering motor to control said resolver and coordinate motors accordingly, a plate having indicia including a first zero mark, a shaft rotatably carried by said head for rotation by said steering head motor and carrying said plate for rotation therewith, indicia including a second zero mark on said optical assembly housing, means extending through said optical assembly housing to said plate, eccentric means rotatably about the axis of said extending means with said zero mark on said housing in alignment with said first zero mark on said plate for translating said optical assembly housing and photocell assembly to a line extending from said plate zero mark to the axis of rotation of said shaft to provide said photocell assembly with zero kerf adjustment, means extending through said plate and said housing permitting rotation of said housing about the axis of said extending means to provide the normal kerf adjustment, and means for translating said optical housing and said eccentric means along said line to displace said optical housing along said line to provide forward offset.

* * * * *